(12) United States Patent
Kirson

(10) Patent No.: US 6,203,438 B1
(45) Date of Patent: Mar. 20, 2001

(54) CONSTANT VELOCITY JOINT

(75) Inventor: Yoram Dov Kirson, Haifa (IL)

(73) Assignee: Yordack Ltd., Haifa (IL)

( * ) Notice: Subject to any disclaimer, the term of this patent is extended or adjusted under 35 U.S.C. 154(b) by 0 days.

(21) Appl. No.: 09/066,755

(22) Filed: Apr. 27, 1998

Related U.S. Application Data

(63) Continuation-in-part of application No. 08/803,139, filed on Feb. 19, 1997, now abandoned.

(51) Int. Cl.[7] ............................................... F16D 3/16
(52) U.S. Cl. ............................................ 464/125; 464/905
(58) Field of Search .................... 464/112, 124, 464/106, 147, 153, 905, 125, 118, 136

(56) References Cited

U.S. PATENT DOCUMENTS

| | | |
|---|---|---|
| 1,058,878 | 4/1913 | Lowndes . |
| 1,562,080 | 11/1925 | Chilton . |
| 1,617,016 | 2/1927 | Douglas . |
| 1,621,667 | 3/1927 | Hayes . |
| 2,236,839 | 4/1941 | Salvetti . |
| 3,326,016 | 6/1967 | Purcell . |
| 3,385,081 | 5/1968 | Wier . |
| 3,456,458 | 7/1969 | Dixon . |
| 3,461,668 | 8/1969 | Garfinkle . |
| 3,965,700 | 6/1976 | Nicoletto . |
| 4,257,243 | 3/1981 | Herchenbach . |
| 4,573,947 | 3/1986 | Hazebrook et al. . |
| 4,786,270 | 11/1988 | Iwasaki . |
| 5,256,107 | 10/1993 | Matsumoto et al. . |
| 5,419,740 | 5/1995 | Koyari et al. . |
| 5,474,500 | 12/1995 | Girguis . |
| 5,660,589 | * 8/1997 | Smith ............................... 464/136 X |
| 5,954,586 | * 9/1999 | Kirson .................................. 464/125 |

FOREIGN PATENT DOCUMENTS

| | | |
|---|---|---|
| 1 942 870 | 3/1971 | (DE) . |
| 2 013 765 | 10/1971 | (DE) . |
| 0 011 159 | 5/1980 | (EP) . |
| 0 361 745 | 4/1990 | (EP) . |
| 0 668 452 | 8/1995 | (EP) . |
| 92728 | 12/1968 | (FR) . |
| 991346 | 5/1965 | (GB) . |
| 575 534 | 4/1958 | (IT) . |
| 143305 | 12/1953 | (SE) . |

OTHER PUBLICATIONS

Merriam–Webster's Collegiate Dictionary, 10th ed., Merriam–Webster Inc., Springfield, MA, p. 1103, 1997.*

"Propeller Shafts and Universal Joints," *The Bosch Book of the Motor Car*, St. Martins Press, New York, 1976, (2 pages).

* cited by examiner

*Primary Examiner*—Lynne H. Browne
*Assistant Examiner*—Greg Binda
(74) *Attorney, Agent, or Firm*—Lowe Hauptman Gopstein Gilman & Berner, LLP

(57) ABSTRACT

A constant velocity joint includes first and second shafts, inner and outer members and a constraining unit. The first shaft has a first yoke attached thereto and the second shaft has a second yoke, smaller than the first yoke, attached thereto. Each shaft has a socket at one end thereof where the socket is concentric about its respective shaft axis. The outer member is pivotally connected to the first yoke about a first rotation axis which is perpendicular to the axis of the first shaft. The inner member is pivotally connected to the second yoke about a second rotation axis which is perpendicular to the axis of the second shaft. The outer member is pivotally connected to the inner member about a third rotation axis which is perpendicular to both the first and second rotation axes. All of the five axes intersect at a joint center point. The constraining unit constrains the third rotation axis to continuously lie generally within the instantaneous homokinetic plane of the joint and includes two balls which slide in the sockets of the shafts.

2 Claims, 16 Drawing Sheets

CONSTANT VELOCITY JOINT

REFERENCE TO RELATED APPLICATION

This application is a continuation-in-part application of U.S. patent application Ser. No. 08/803,139, filed Feb. 19, 1997 and entitled "CONSTANT VELOCITY JOINT" now abandoned.

FIELD OF THE INVENTION

The present invention relates to constant velocity, universal joints in general.

BACKGROUND OF THE INVENTION

A universal joint, in general, is a mechanical coupling between two rotating shafts, used to transmit power, motion, or both. The axes of the shafts are always intersecting and the bending angle between them is permitted to change during operation. The "Cardan joint" (also called "Hooke's joint") is a well known example of a universal joint. It is noted that the Cardan joint transmits rotary motion but does not ensure that the angular velocities of the shafts are equal at all times.

A constant velocity universal joint, on the other hand, is a universal joint that transmits a rotary motion while keeping the angular velocities of the shafts equal at all times.

True constancy of angular velocity transmission is achieved by a widely used arrangement of two Cardan joints in series, the output member of the first joint comprising the input member to the second joint. It is noted, however, that the constancy is kept only under strict geometrical requirements: both input and output shafts must lie in one plane and both bending angles of the two Cardan joints must be kept equal at all times. This principle is used in the so called Double Cardan Universal Joint, as described for example in U.S. Pat. Nos. 4,257,243 and 5,419,740, where two Cardan joints are connected by a relatively short intermediate member designed to meet said geometrical requirements.

Another known constant velocity universal joint, which is commonly used in motor vehicle front-wheel drives, is the Rzeppa joint. It operates on the basic principle that constancy of transmission is ensured when the contact point or points between the two shafts lie in the so called "homokinetic plane" of the joint. This plane is normal to the plane defined by the two shaft axes and lies along the bisector of the angle between the two shaft axes. The Rzeppa joint consists of a cage that keeps six balls in the homokinetic plane at all times. A further development of the Rzeppa joint, that allows not only angular but also axial relative movement of the shafts, is described in U.S. Pat. No. 4,573,947.

Examples of other types of universal joints, or constant velocity universal joints, are described in U.S. Pat. Nos. 4,786,270, 5,474,500, and 5,256,107, as well as European Patent Publication 668 452 A1.

SUMMARY OF THE PRESENT INVENTION

It is an object of the present invention to provide a novel constant velocity, universal joint and a novel, fixed angle constant velocity joint.

There is therefore provided, in accordance with a preferred embodiment of the present invention, a constant velocity joint which includes first and second shafts, inner and outer members and a constraining unit. The first shaft has a first yoke attached thereto and the second shaft has a second yoke, smaller than the first yoke, attached thereto. Each shaft has a socket at one end thereof where the socket is concentric about its respective shaft axis. The outer member is pivotally connected to the first yoke about a first rotation axis which is perpendicular to the axis of the first shaft. The inner member is pivotally connected to the second yoke about a second rotation axis which is perpendicular to the axis of the second shaft. The outer member is pivotally connected to the inner member about a third rotation axis which is perpendicular to both the first and second rotation axes. All of the five axes intersect at a joint center point. The constraining unit constrains the third rotation axis to continuously lie generally within the instantaneous homokinetic plane of the joint and includes two balls which slide in the sockets of the shafts.

Additionally, in accordance with a preferred embodiment of the present invention, the constraining unit includes a cylindrical stud unit, a cylindrical jacket and first and second rods. The cylindrical stud unit includes a stud axis, the two balls, the first rod and a third ball. The centers of the two balls are connected by a center line which is at least one of parallel and coincident with the sleeve axis. The cylindrical jacket has a jacket axis and a slot. The second rod is connected to the cylindrical jacket, extends away from the jacket axis and ends in a fourth ball. The first rod extends away from the stud axis and the cylindrical stud sits rotatably about the stud axis within the cylindrical jacket. The first rod extends through the slot and the center points of the third and fourth balls lie in a plane that perpendicularly bisects the center line and the inner member has two socket portions concentric about the third rotation axis for slidably receiving the third and fourth balls.

Further, in accordance with a preferred embodiment of the present invention, the constraining unit includes a disk and an annular housing. The disk has the two balls connected thereto, a disk axis connecting the center points of the two balls and two parallel planar surfaces which are perpendicular to the disk axis. The annular housing has parallel inner walls and opposing bores. The parallel inner walls form an inner annular groove within which the disk may slide and rotate. The annular groove is of a width to permit a sliding contact between the parallel planar surfaces of the disk and the parallel inner walls and the opposing bores lie along a pivot axis which is in a plane that perpendicularly bisects the disk axis. The annular housing is pivotally connected to the inner member about the pivot axis such that the pivot axis coincides with the third rotation axis.

Moreover, in accordance with a preferred embodiment of the present invention, the disk can be either concentric about or eccentric with the socket axis.

The above embodiments provide a universal, constant velocity joint. The present invention is also operative to provide a non-universal constant velocity joint.

In accordance with one embodiment, the constraining unit includes a pair of rollers of the same radii and a fixed planar ring. The pair of rollers are connected externally to the outer member along the third rotation axis and rotate about the third rotation axis. The rollers are located on opposite sides of the joint center point along the third rotation axis. The planar ring is fixed along a plane parallel to the fixed homokinetic plane and distant therefrom by the radius of the rollers wherein the pair of rollers are capable of rolling along a surface of the fixed planar ring.

Finally, in a further embodiment, the constraining unit includes a fixed housing, an outer ring and a rod. The outer ring is connected to the fixed housing by bearings whose axis of rotation is normal to the fixed homokinetic plane. The rod is connected externally to the outer member and ends with a ball whose center point lies along the third rotation axis. The ball sits slidably in a radial bore of the outer ring that is concentric with an axis perpendicular to the axis of rotation and lies within the fixed homokinetic plane.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1:
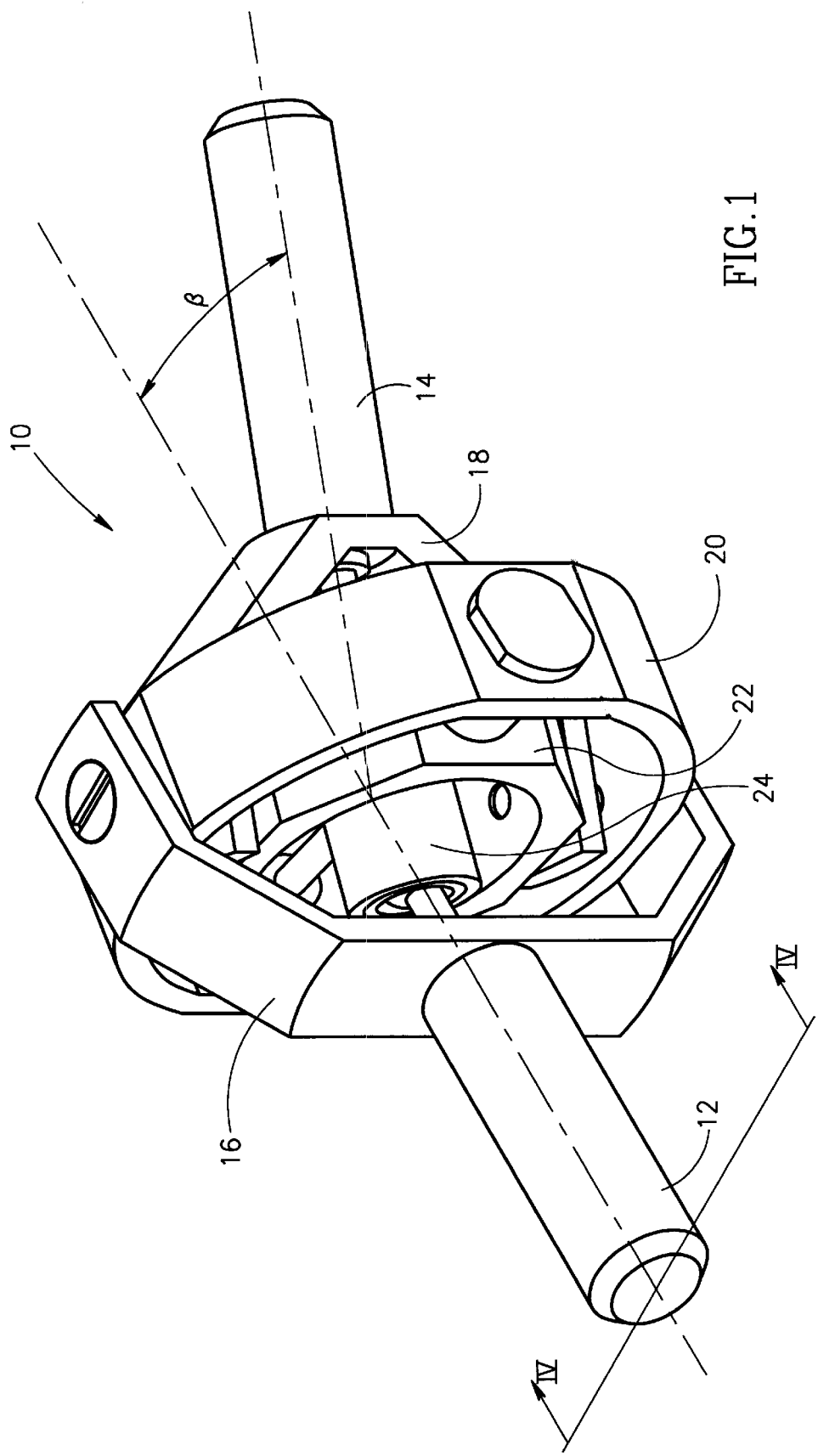
FIG. 1 is an isometric illustration of a universal, constant velocity joint, constructed and operative in accordance with a preferred embodiment of the present invention.
Figure 2:
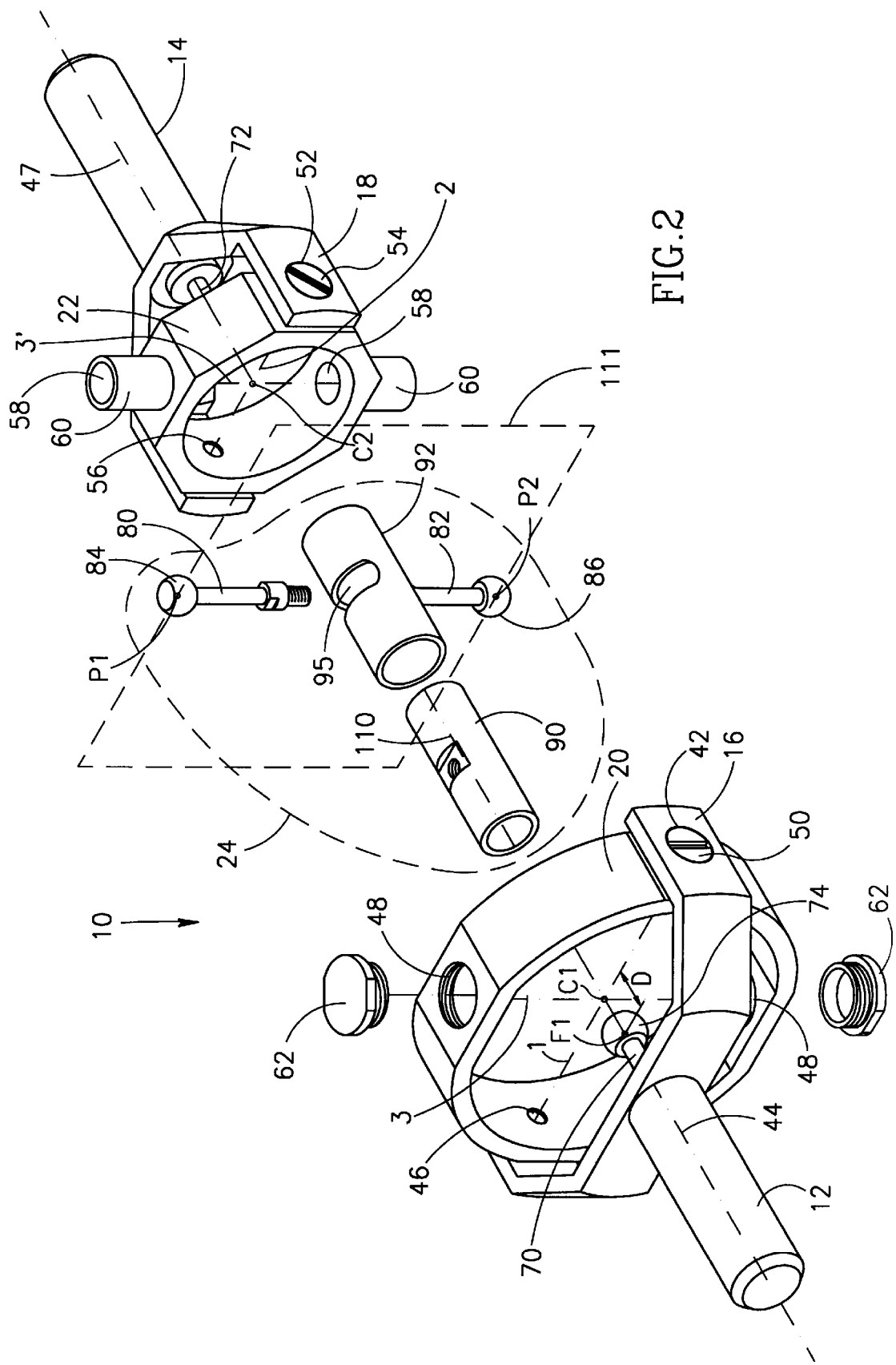
FIG. 2 is an expanded view of the elements of the joint of FIG. 1.
Figure 3:
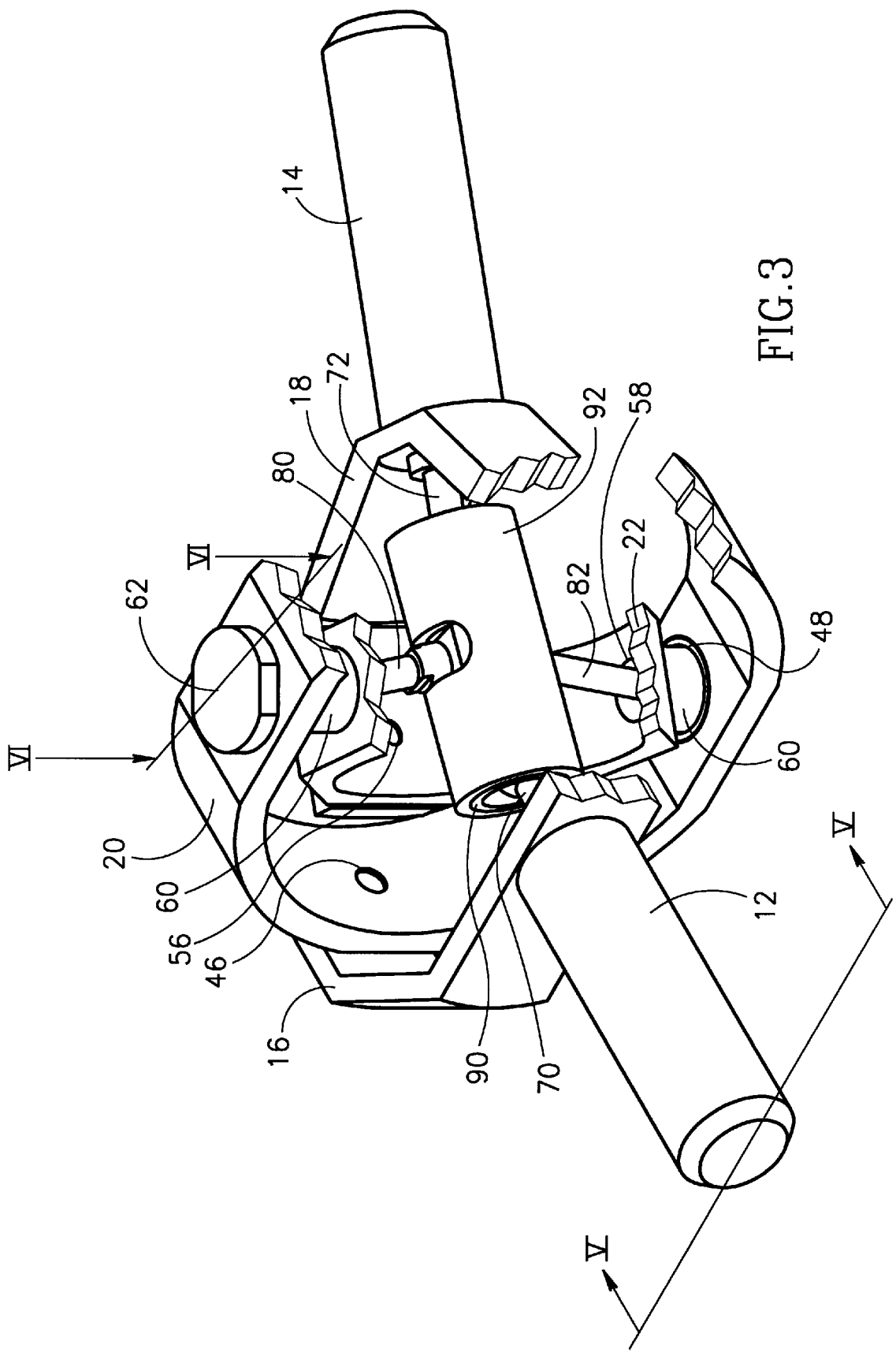
FIG. 3 is a cutaway view of the joint of FIG. 1 in a second position rotated 90° from the position of FIG. 1.

Reference is made to FIGS. 1, 2 and 3 which illustrate a universal, constant velocity joint 10, constructed in accordance with a preferred embodiment of the present invention and operative to transmit rotational motion from a first shaft 12 to a second shaft 14 while keeping the angular velocities of the shafts equal at all times. Shafts 12 and 14 have a variable bending angle β therebetween.

FIG. 1 isometrically illustrates the joint in one singular position. FIG. 2 illustrates the elements of joint 10 in an expanded view. FIG. 3 is an isometric, cut view of joint 10 in second singular position, where shafts 12 and 14 are 90° rotated from the position of FIG. 1.

Joint 10 typically comprises an outer yoke 16 connected to shaft 12, an inner yoke 18 connected to shaft 14, an outer ring 20, an inner ring 22 and a constraining mechanism 24. It will be appreciated that the yoke and ring mechanism of joint 10 enables the two shafts 12 and 14 to rotate about their axes together while enabling the bending angle β therebetween to change.

FIG. 2 illustrates the elements of joint 10 in expanded format and indicates how they are connected together. On the far left are the yoke and ring elements of shaft 12 and on the far right are the yoke and ring elements of the shaft 14. In the center are the elements which form the constraining mechanism 24.

The end portions of outer yoke 16 are formed with two in-line bores 42 (only one is visible in FIG. 2). Together, bores 42 define an axis, labeled 1, which is perpendicular to an axis 44 of shaft 12. The intersection point of axes 1 and 44 is labeled C1. The outer ring 20 is formed with two pairs of in-line bores 46 and 48 wherein bores 48 define an axis 3 which perpendicularly intersects the axis defined by bores 46.

The outer ring 20 is rotatably connected to yoke 16 via a pair of pins 50 (only one of which is shown) mounted within bores 42 and 46. Pins 50 permit relative rotation between yoke 16 and outer ring 20 about axis 1 while constraining axis 3 to intersect axis 1 at point C1. Other suitable connections are also possible and are within the scope of the present invention.

Inner ring 22 is similarly connected to inner yoke 18. The end portions of inner yoke 18 are formed with two in-line bores 52 (only one is visible in FIG. 2). Together, bores 52 define an axis, labeled 2, which is perpendicular to an axis 47 of shaft 14. The intersection point of axes 2 and 47 is labeled C2. Inner ring 22 is formed with two pairs of in-line bores, 56 and 58 wherein bores 58 define an axis 3' which perpendicularly intersects the axis defined by bores 56. Inner ring 22 is rotatably connected to yoke 18 via a pair of pins 54 (only one of which is shown) mounted within bores 52 and 56. Pins 54 permit relative rotation between yoke 18 and inner ring 22 about axis 2 while constraining axis 3' to intersect axis 2 at point C2.

Inner ring 22 is typically formed with cylindrical portions 60 which are concentric with bores 58 and axis 3'. When joint 10 is assembled, the cylindrical portions 60 of inner ring 22 are placed within bores 48 of outer ring 20 and are held there by suitable bearings, such as by screwcaps 62. After assembly, axes 3 and 3' coincide as do intersection points C1 and C2. The common intersection point is hereinbelow called the center point Cj of the joint and the common third axis is called axis 3 hereinbelow. It is noted that screwcaps 62 enable the cylindrical portions 60 to rotate therewithin, thereby providing rotation between inner ring 22 and outer ring 20 about axis 3.

It will be appreciated that yokes 16 and 18 can be double-sided (as shown), single sided (not shown) or any other suitable shape as desired which provides connection to an axis perpendicular to the relevant shaft axis.

Joint 10 additionally comprises rods 70 and 72 respectively connected to, or integrally formed with, shafts 12 and 14. Rod 70 ends with a ball 74 whose center F1 is located on axis 44 of shaft 12 a distance D away from intersection point C1. Similarly, rod 72 ends with a ball 76 (not shown in FIG. 2 but shown in FIGS. 4 and 5) whose center F2 is located on axis 47 of shaft 14. Center F2 is also the distance D away from intersection point C2.

The constraining mechanism 24 comprises a cylindrical sleeve 90 with a central axis 110, a cylindrical jacket 92 and two rods 80 and 82. When assembled, sleeve 90 sits within jacket 92 and can rotate therewithin. Rod 80 is connectable, such as by a screw, to sleeve 90 when sleeve 90 sits inside jacket 92. For this purpose, jacket 92 has a slot 95 through which rod 80 can reach sleeve 90. Furthermore, rod 80, when rigidly connected to sleeve 90, can rotate with respect to jacket 92, about axis 110, within the constraints of slot 95. Rod 82 is integrally connected to jacket 92 at a location directly opposite to the center of slot 95. Rods 80 and 82 end with balls 84 and 86 whose centers are P1 and P2, respectively. Mechanism 24 constrains centers P1 and P2 to always move within a plane 111 (herein called the "constraining mechanism plane") which is normal to axis 110 of sleeve 90.

Figure 4:
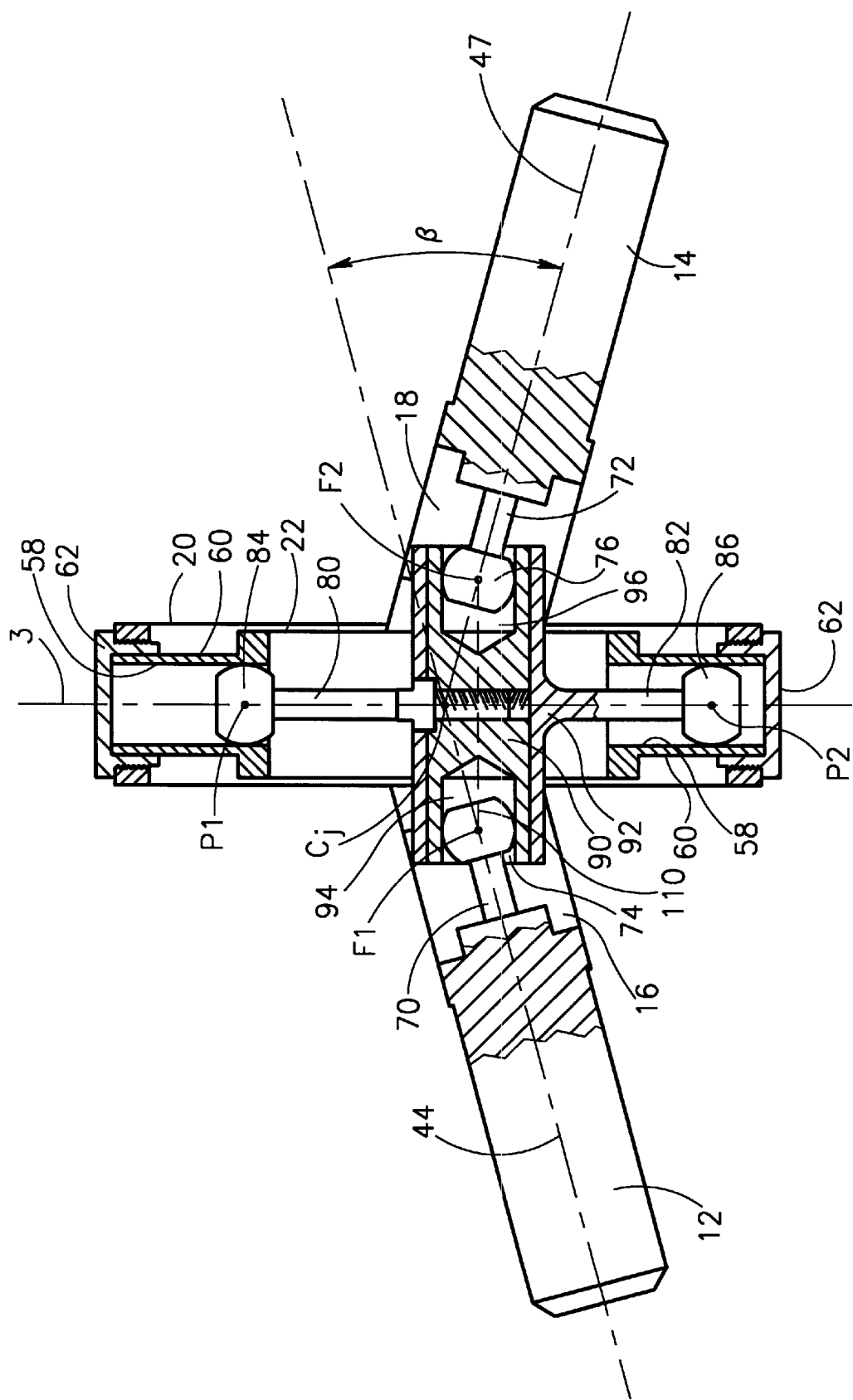
FIG. 4 is a sectional view of the joint cut horizontally through the plane of the shafts of FIG. 1, as shown by lines IV—IV of FIG. 1.
Figure 5:
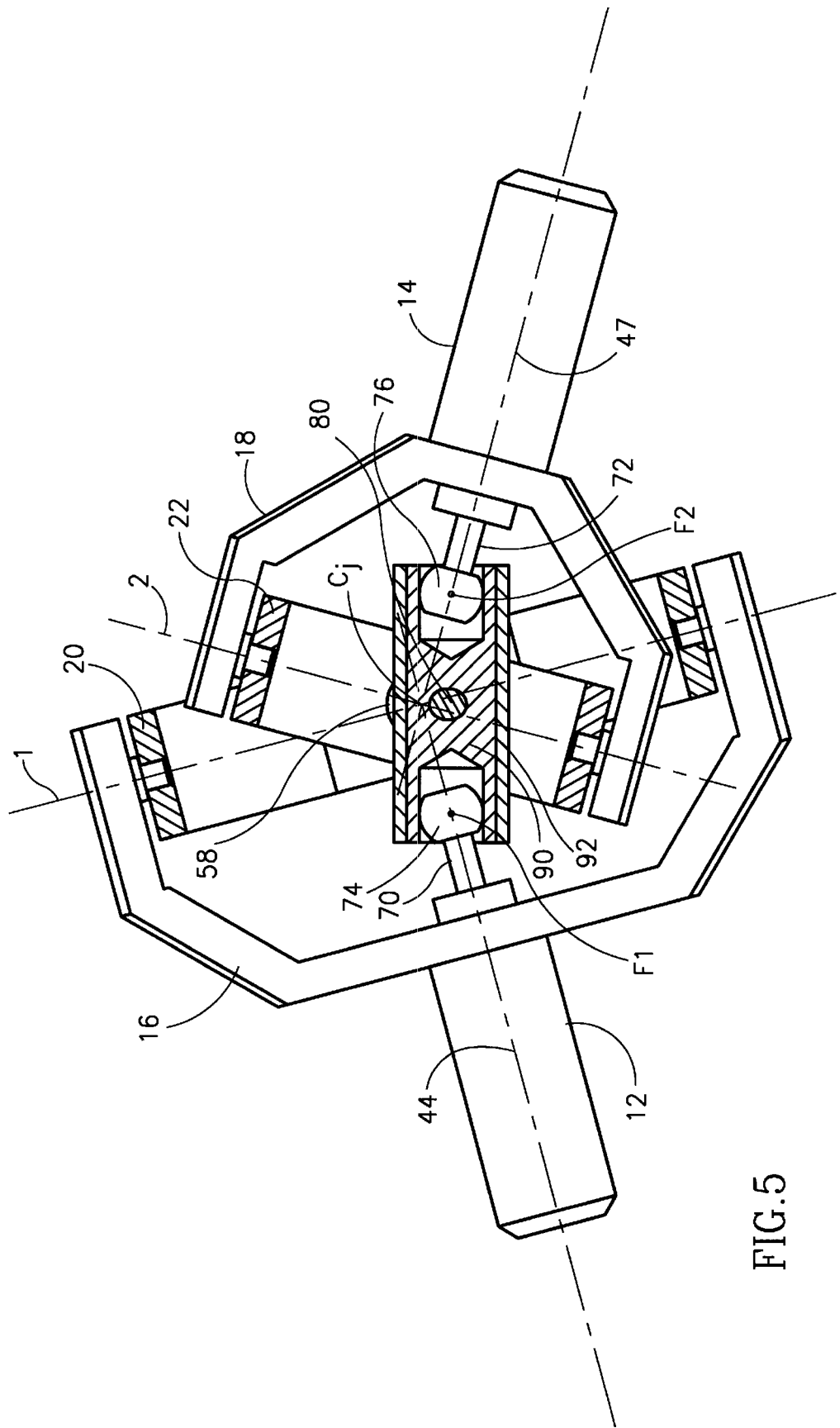
FIG. 5 is a sectional view of the joint cut horizontally through the plane of the shafts of FIG. 3, as shown by along lines V—V of FIG. 3.
Figure 6:
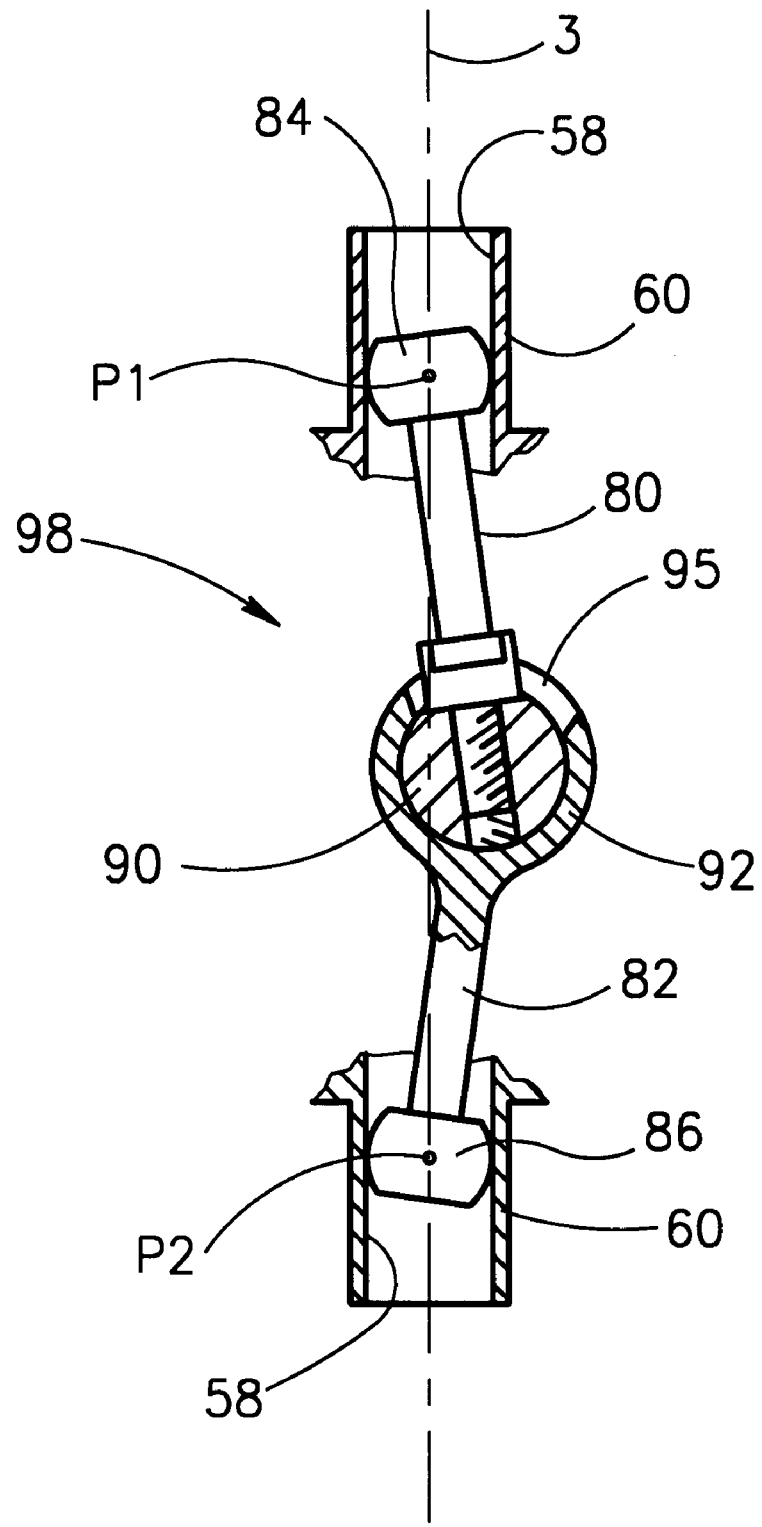
FIG. 6 is a partial sectional view of the joint cut vertically through the homokinetic plane of FIG. 3, as indicated by lines VI—VI of FIG. 3.

Reference is now briefly made to FIGS. 4, 5 and 6 wherein FIG. 4 is a horizontal cut view of FIG. 1, FIG. 5 is a horizontal cut view of FIG. 3 and FIG. 6 is a partial vertical cut view, through the homokinetic plane, of FIG. 3.

As can be seen in FIGS. 4 and 5, sleeve 90 includes two sockets 94 and 96 which are concentric with the central axis 110 of sleeve 90. Balls 74 and 76 sit in sockets 94 and 96 of sleeve 90, respectively. As can be seen in FIGS. 4 and 6, balls 84 and 86 sit in bores 58 of inner ring 22 and cylindrical portions 60. The balls have a close sliding contact with their mating sockets.

It will be appreciated that balls 74, 76, 84 and 86 slidably and rotatably connect constraining mechanism 24 to shafts 12 and 14 and to inner ring 22. The balls 74, 76, 84 and 86 can slide and rotate within their respective holding element, whether sleeve 90 or inner ring 22. This enables constraining mechanism 24 to move about, always constraining axis 3 to lie within the instantaneous homokinetic plane of joint 10, as shown hereinbelow.

Returning to FIG. 4, it is noted that, when balls 74 and 76 are within sockets 94 and 96, respectively, central axis 110 of sleeve 90 is constrained to coincide with line F1-F2. It is further noted that ball centers F1 and F2 are both located the distance D from the center Cj of joint 10.

When shafts 12 and 14 are collinear (i.e. bending angle β of FIG. 4 is 0°), the center Cj lies on axis 110 of sleeve 90. Otherwise (i.e. bending angle β is other than 0°) and as shown in FIG. 4, axis 110 is away from center Cj of joint 10. In the latter case, centers F1, F2 and Cj form an isosceles triangle where the sides of the triangle from the center Cj of joint 10 to each of centers F1 and F2 of balls 74 and 76, respectively, are of the same length D. The base between centers F1 and F2 changes length as shafts 12 and 14 change the bending angle β therebetween.

Figure 7B:
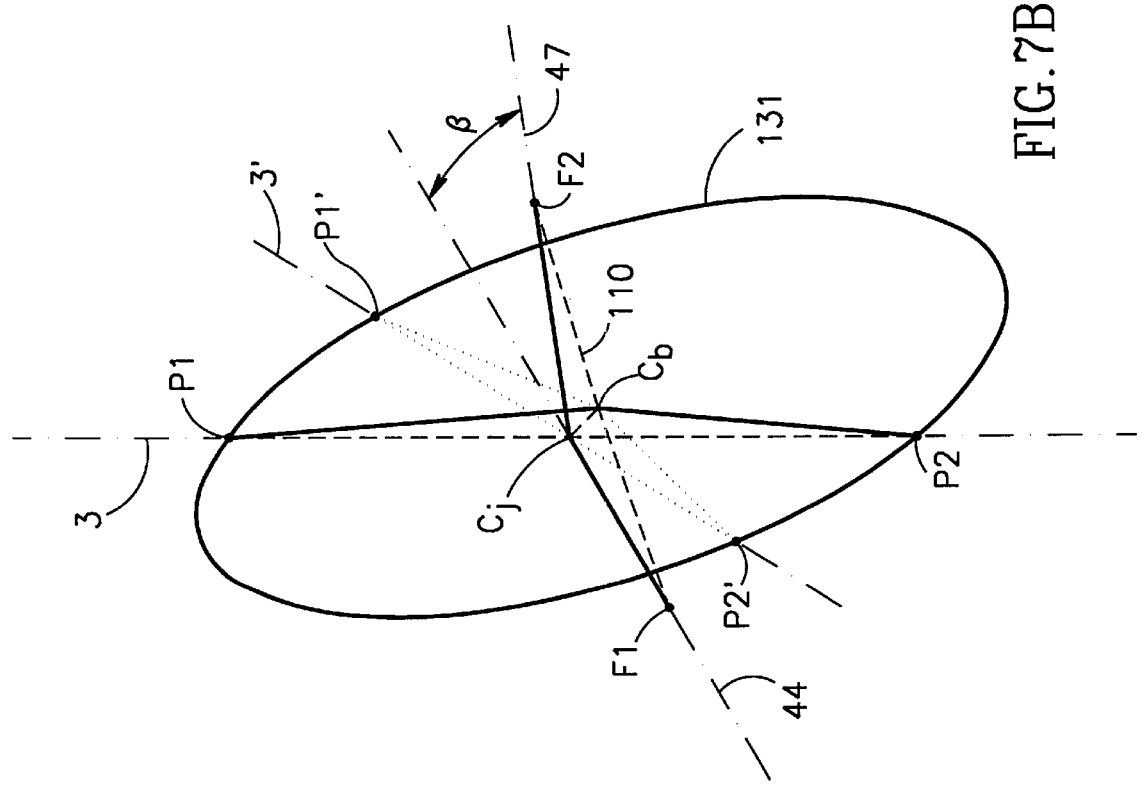
FIGS. 7A and 7B are geometric illustrations of the principles of operation of the joint of FIG. 1 at two different bending angles.
Figure 7A:
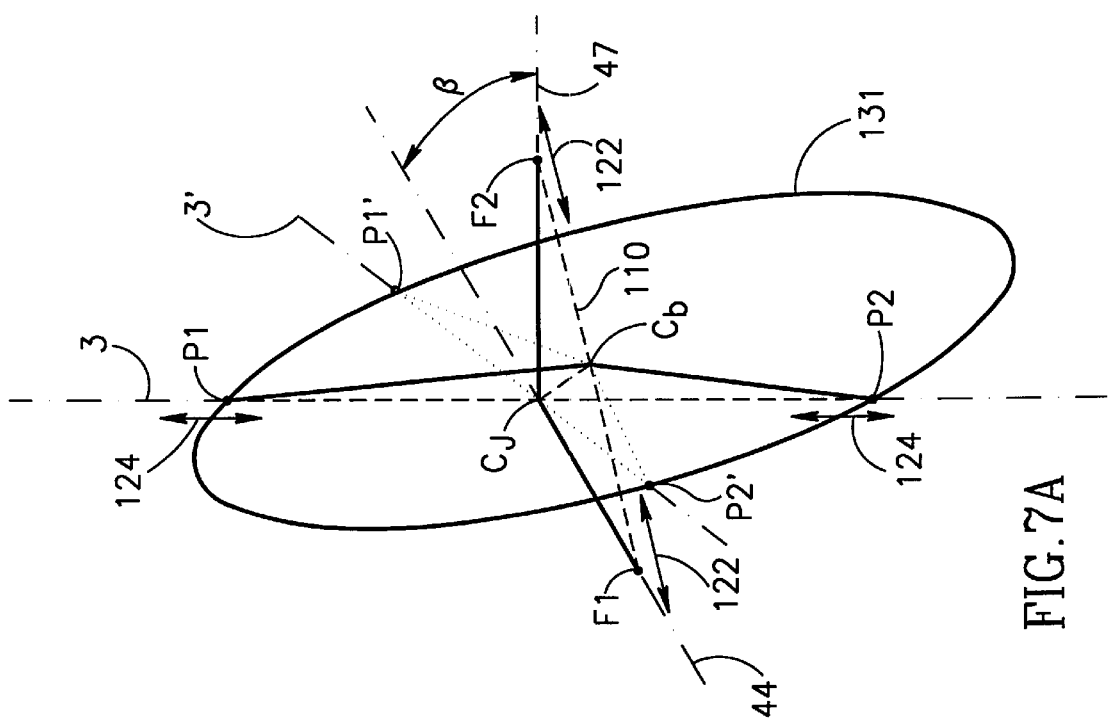

Reference is now made to FIGS. 7A and 7B which illustrate the kinematic principle of operation of joint 10 in two positions, where FIG. 7A shows a 45° bending angle and FIG. 7B shows a 30° bending angle. Solid lines represent fixed relationships, dashed lines represent changeable relationships and dotted lines represent a rotated, second position of the joint 10.

FIG. 7A shows the isosceles triangle F1-F2-Cj which lies in the plane of the shafts, i.e. the plane defined by axes 44 and 47 of shafts 12 and 14, respectively. As is known in the art, the bisector of the head angle of an isosceles triangle is perpendicular to its base. Thus, the bisector Cj-Cb of angle F1-Cj-F2 is perpendicular to base F1-F2 and Cb is the midpoint of base F1-F2.

Recall that the homolinetic plane of joint 10 is normal to the plane of shaft axes 44 and 47 (herein called "the shaft plane") and the bisector (i.e. Cj-Cb) of the angle between the shafts is the intersection line of the two planes. Therefore, both points Cj and Cb are in the homolinetic plane. Now, base F1-F2 lies in the shaft plane and is perpendicular to bisector Cj-Cb. As is known in the art, when two planes are normal to each other, a line which lies in the first plane and is perpendicular to the intersection line of the two planes, is normal to the second plane. Thus, line F1-F2, which is perpendicular to bisector Cj-Cb and lies in the shaft plane, is normal to the homokinetic plane.

Recall that constraining mechanism plane 111 (see FIG. 2), within which points P1 and P2 move, is normal to axis 110. When joint 10 is assembled, balls 74 and 76, whose centers are points F1 and F2, respectively, constrain axis 110 of constraining mechanism 24 to coincide with line F1-F2. With just this connection, constraining mechanism plane 111 is normal to line F1-F2 and thus, parallel to the homokinetic plane.

Likewise, when joint 10 is assembled, balls 84 and 86, whose centers are P1 and P2, respectively, constrain axis 3, which is the axis of bores 58 and cylindrical portions 60, to be in constraining mechanism plane 111. In addition, center point Cj, which is along axis 3, is already within the homokinetic plane, as discussed hereinabove. As a result, constraining mechanism plane 111 coincides with the homokinetic plane and axis 3 is constrained to lie within the homolinetic plane.

The function of mechanism 24 is demonstrated in FIG. 7A, where axis 3 is shown in two positions. In the first position, which corresponds to the singular position of FIG. 3, axis 3 is normal to the shaft plane, and passes through points P1, Cj and P2. When shafts 12 and 14 rotate only about their axes 44 and 47, respectively, while keeping the same angle therebetween, isosceles triangle F1-F2-Cj does not change position in space but axis 3 is constrained to reach a second, general position that passes through points P1', Cj and P2'. During this rotating motion, points P1 and P2 also slide up and down along the rotating axis 3, as shown by arrows 124, while staying on a circle 131 in the homokinetic plane normal to axis 110.

It will be appreciated that the length of rods 80 and 82 and thus the distances Cb-P1 and Cb-P2, do not have to be equal. In general, points P1 and P2 would trace two concentric circles, similar to circle 131, with unequal radii.

FIG. 7B is similar to FIG. 7A except that bending angle, between the shafts is smaller. It is noted that when bending angle, between shaft axes 44 and 47 is changed, central axis 110 of sleeve 90 moves to and from the center point Cj and ball centers F1 and F2 move in and out along central axis 110 (arrow 122 of FIG. 7A). Note the different positions of axis 110, ball centers F1 and F2 and circle 131 in FIGS. 7A and 7B.

Figure 8:
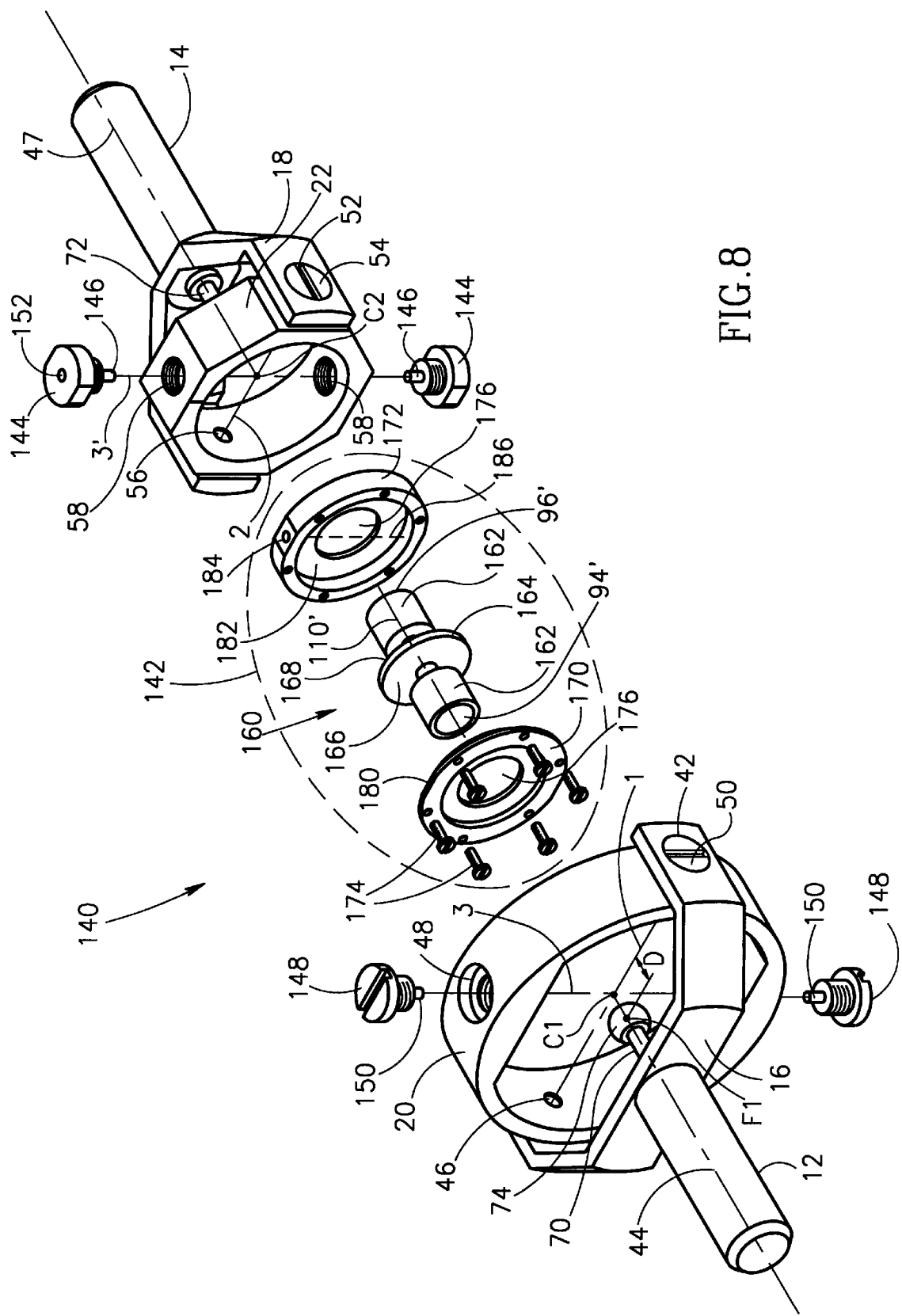
FIG. 8 is an expanded view of a universal, constant velocity joint, constructed and operative in accordance with a second preferred embodiment of the present invention.
Figure 9:
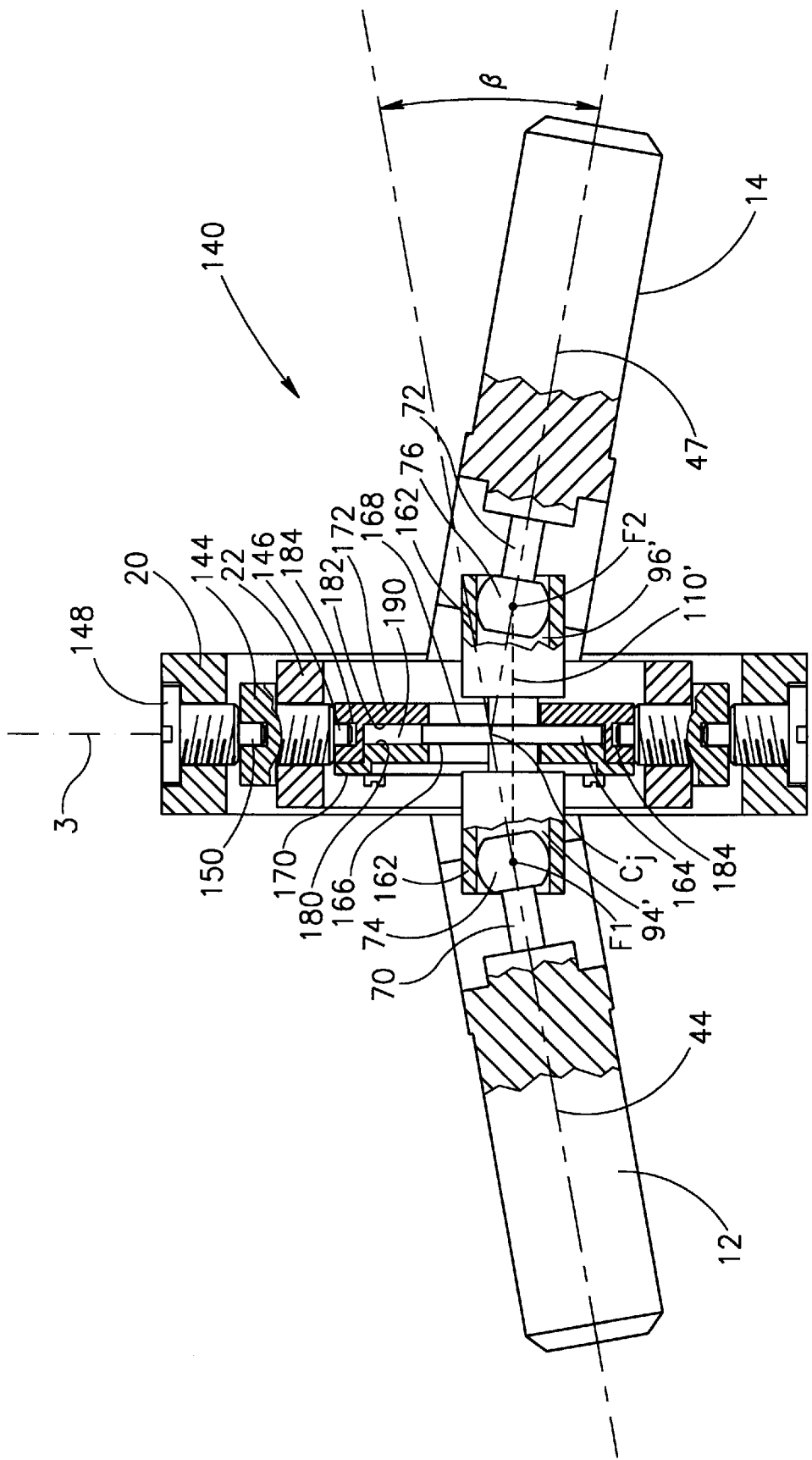
FIG. 9 is a sectional view of the assembled joint cut through the plane of the shafts, similar to FIG. 4.

Reference is now made to FIGS. 8 and 9 which illustrate an alternative joint, labeled 140, having a disk-based constraining mechanism 142. Similar reference numerals refer to similar elements.

As in the previous embodiment, joint 140 connects shafts 12 and 14 with the yoke-ring mechanism formed of yokes 16 and 18, rings 20 and 22, rods 70 and 72, balls 74 and 76 and rotary in-line bearings formed from bores 42, 46, 52 and 56, and pins 50 and 54. As before, the yoke-ring mechanism defines axes 1, 2, 3 and 3', intersection points C1 and C2 and ball centers F1 and F2 and the shafts define axes 44 and 47.

In this embodiment, bores 48 and 58 are tapped to receive screws therein. Inner ring 22 includes two shafted screws 144, having shafts 146, which are screwed into bores 58 and outer ring 20 includes two shafted screws 148, having shafts 150, which are screwed into bores 48 during assembly. Shafts 146 and 150 are concentric with axes 3' and 3, respectively, after assembly. Screws 144 also have in-line bores 152 within which shafts 150 lie after assembly. Thus, rings 20 and 22 are rotatably connected about the combined axis 3 via shafts 150 and screws 144.

Constraining mechanism 142 comprises a sleeve/disk unit 160 and an annular unit formed of two annular plates 170 and 172. Sleeve/disk unit 160 is formed of two sleeves 162 integrally mounted to a disk 164. Sleeves 162 include two sockets 94' and 96' which are concentric about an axis 1101 (similar to axis 110 of the previous embodiment) and receive balls 74 and 76 after assembly. Disk 164 is concentric with axis 110' and has two parallel planes 166 and 168 which are both normal to axis 110'.

When annular plates 170 and 172 are fastened together via screws 174, they define an annular groove in which disk 164 sits. Plates 170 and 172 also define holes 176 through which sleeves 162 protrude after assembly and inner walls 180 and 182, respectively, of the annular groove against which disk 164 slides during operation.

Plate 172 also includes two in-line bores 184 (only one shown) which define an axis 186 which is parallel to wall 182. Shafts 146 of screws 144 fit into bores 184, thereby rotatably connecting constraining mechanism 142 with inner ring 22 and aligning axis 186 with axis 3. When constraining mechanism 142 is assembled, axis 186 is constrained to be parallel to the planes 166 and 168 of disk 164.

FIG. 9 is a sectional illustration showing joint 140 in its assembled state. As can be seen, balls 74 and 76 slidably lie respectively within sockets 94' and 96' of sleeves 162 and disk 164 is slidably located within the annular groove (labeled 190) between annular plates 170 and 172.

FIG. 9 also indicates centers F1 and F2 of balls 74 and 76, respectively, the axis 110' of constraining mechanism 142, and the center Cj of joint 140 which is the intersection point of the two shaft axes 44 and 47. As in the previous embodiment, centers F1 and F2 constrain axis 110' to coincide with line F1-F2. A change in the angle between shafts 12 and 14 changes the location of line F1-F2 with respect to center Cj and moves disk 164 radially within annular groove 190.

Because axis 110' is constrained to coincide with line F1-F2, parallel planes 166 and 168 are normal to line F1-F2 and, accordingly, are parallel to the homokinetic plane (which, as mentioned hereinabove, is normal to line F1-F2). Parallel planes 166 and 168 slide against walls 180 and 182, respectively, and constrain them to be parallel to the homokinetic plane. Axis 186, defined by bores 184, is thus constrained to be parallel to the homokinetic plane.

Bores 184 also constrain shafts 146, which define axis 3, to be parallel to the homokinetic plane. As in the previous embodiment, axis 3 now has two constraints: 1) it is parallel to the homokinetic plane and 2) it includes a point Cj which is in the homokinetic plane. Thus, axis 3 is constrained to remain in the homokinetic plane.

When shafts 12 and 14 rotate, they cause the yoke-ring mechanism to rotate which, in turn, causes the combined annular plates 170 and 172 to rotate about an axis which a) is parallel to line F1-F2 and b) includes point Cj. At the same time, sleeve/disk unit 160, which has a rotational degree of freedom about line F1-F2, will rotate in the same direction as annular plates 170 and 172 due to friction forces which develop between disk 160 and the walls of groove 190 and also between balls 74 and 76 and sockets 94' and 96' of sleeves 162. The instantaneous angular position of sleeve/disk unit 160, however, is indeterminate as it depends on arbitrary work conditions and the design parameters of joint 140.

It will be appreciated that the relative diameters of the disk 164 and the groove 190 define the range of bending angle β. FIG. 9 illustrates joint 140 at one extreme position (disk 164 is at the lower end of groove 190) where the bending angle β is at its maximal value βmax. The bending angle range of joint 140 is thus ±βmax.

Figure 10:
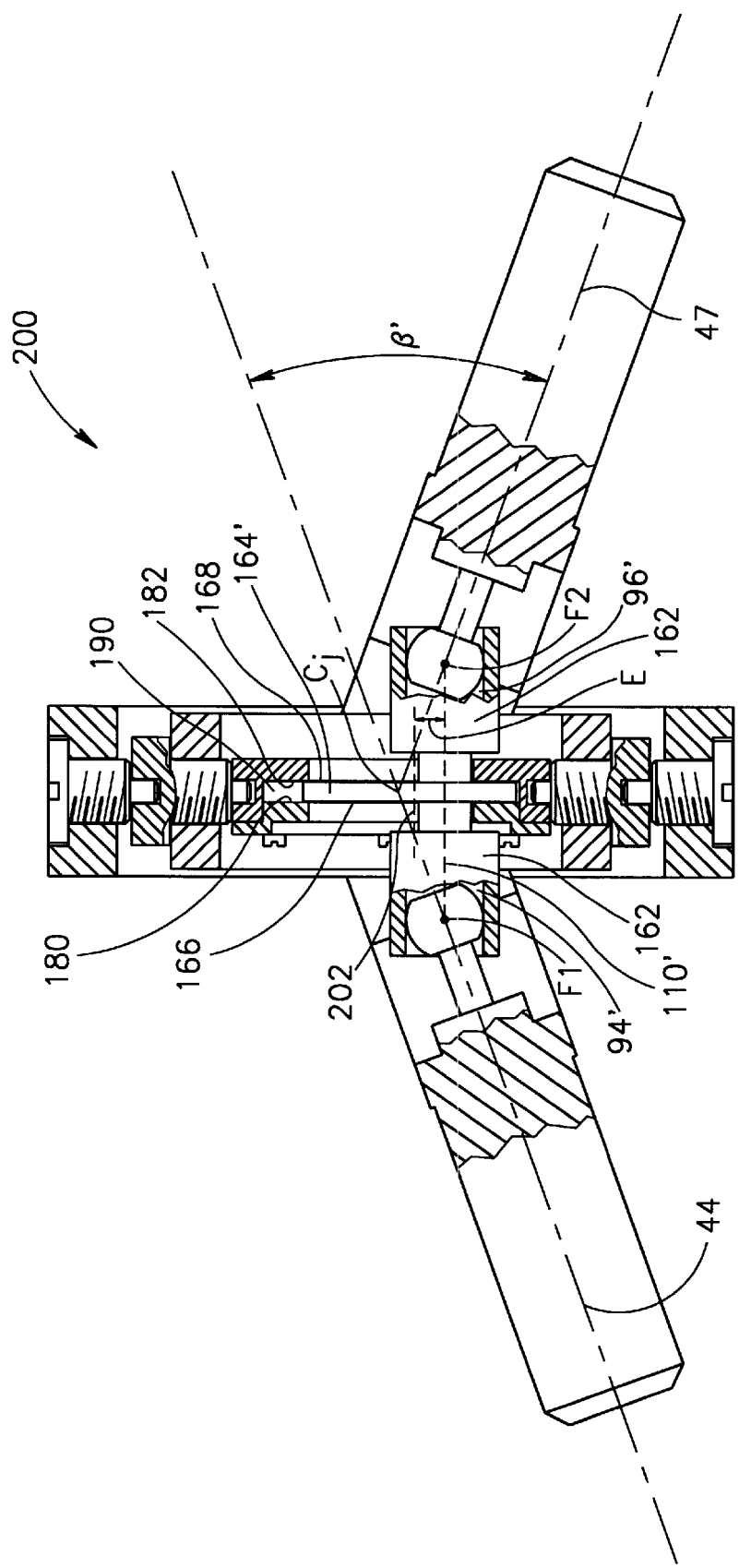
FIG. 10 is a sectional view, similar to FIG. 9, but for a third preferred embodiment of the present invention.

The value of bending angle βmax can be significantly increased by placing disk 164 at an eccentric position with respect to axis 110'. The latter case is shown in FIG. 10, to which reference is now made. Similar reference numerals refer to similar elements.

In joint 200 of FIG. 10, the center axis 202 of the disk, labeled 164', lies at a distance E from axis 110' of sockets 94' and 96'. FIG. 10 shows the bending angle β' at its maximal position βmax which, as can be seen, is larger than the maximum bending angle β of FIG. 9.

It should be noted, however, that the joint of FIG. 10 with eccentric disk 164' is intended for use in a joint which provides a bending angle range around a non-zero nominal bending angle βnom (i.e. the range is βnom±βr). Furthermore, during joint rotation, the external cylindrical surface of eccentric disk 164' bumps against the internal cylindrical surface of groove 190, preventing sleeve/disk unit 160 of this embodiment from rotation about axis 110'.

Figure 11:
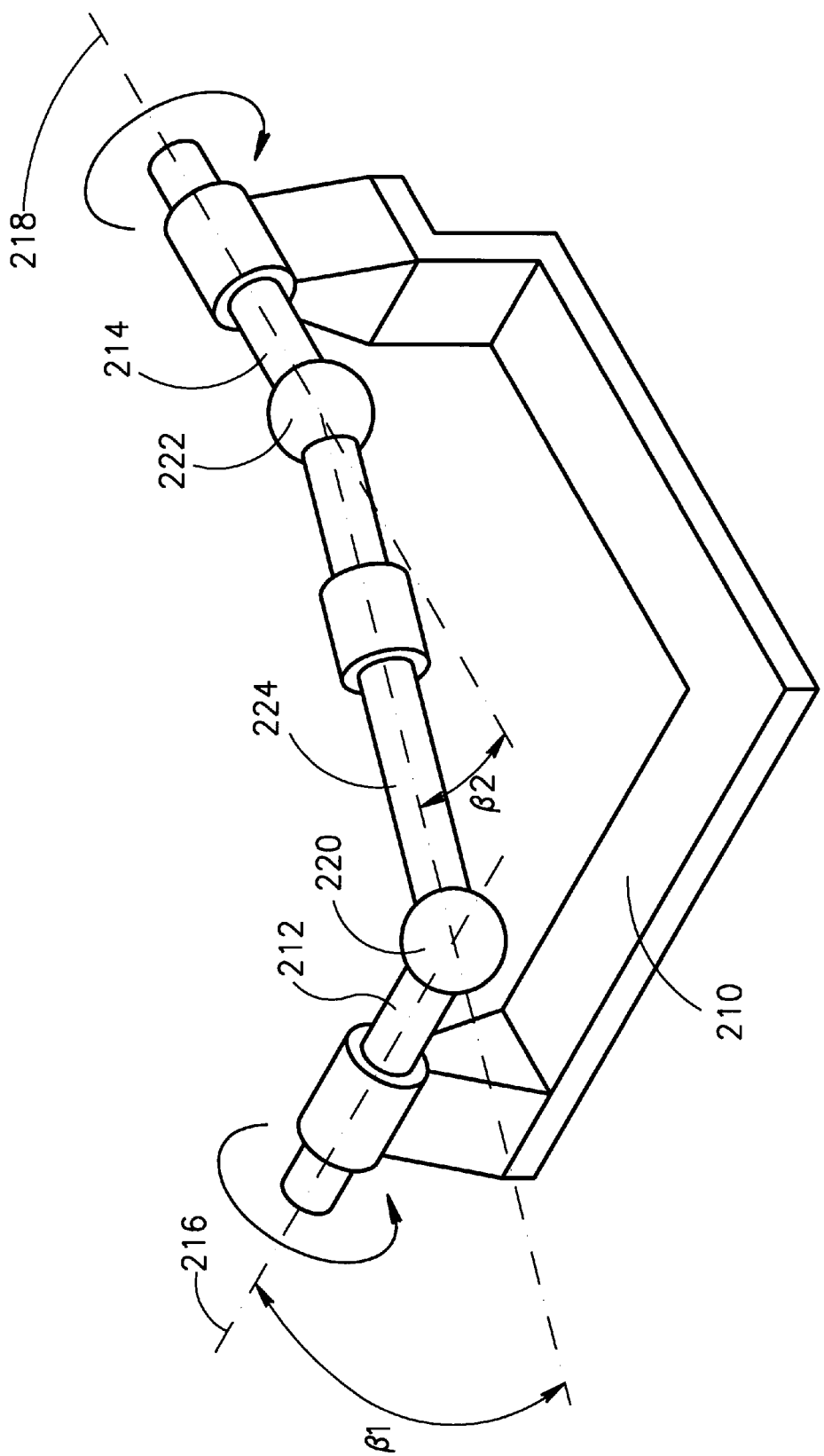
FIG. 11 is a schematic illustration of a mechanical system having constant velocity joints.
Figure 12:
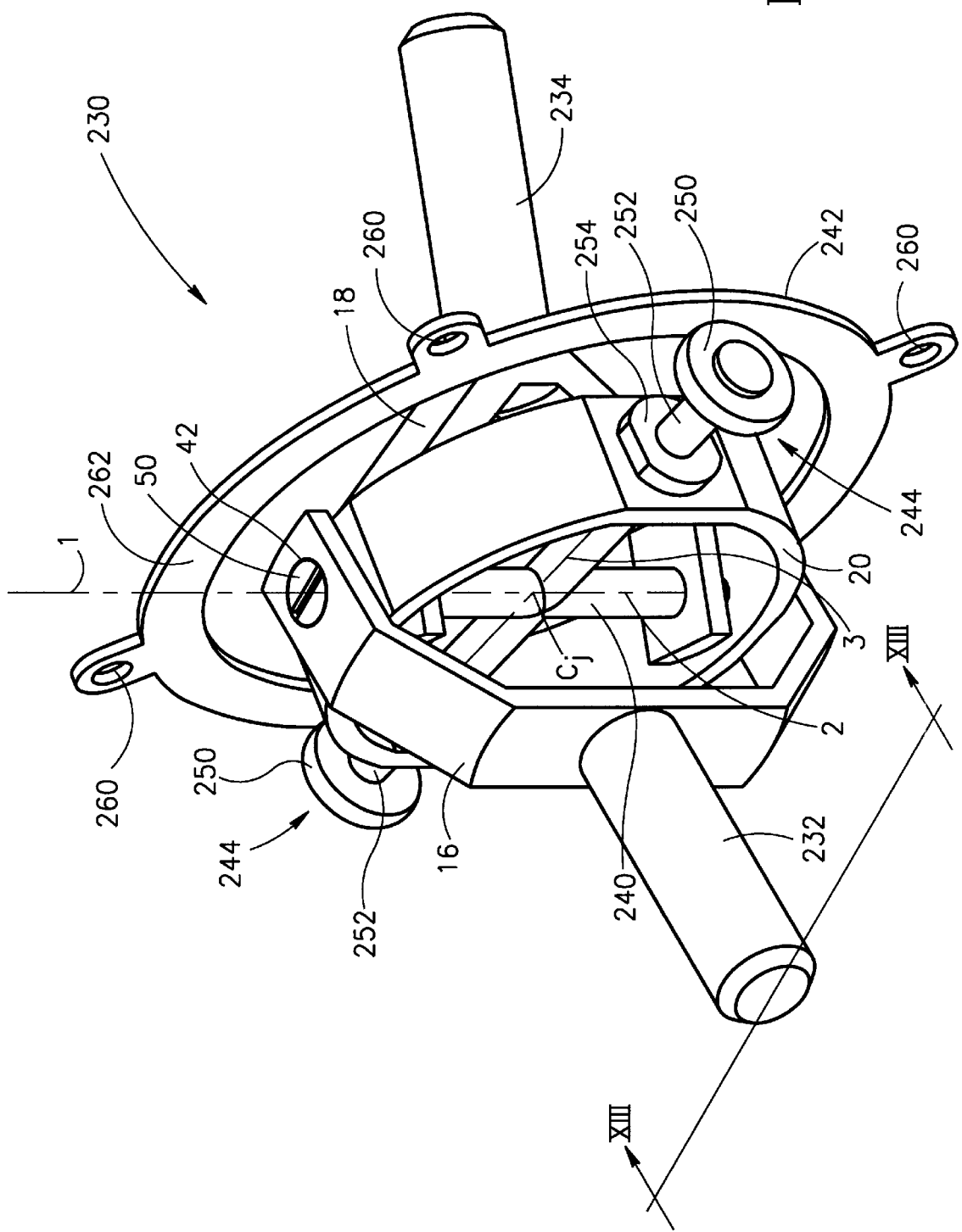
FIG. 12 is an isometric illustration of a fixed angle, constant velocity joint, constructed and operative in accordance with a fourth preferred embodiment of the present invention.
Figure 13:
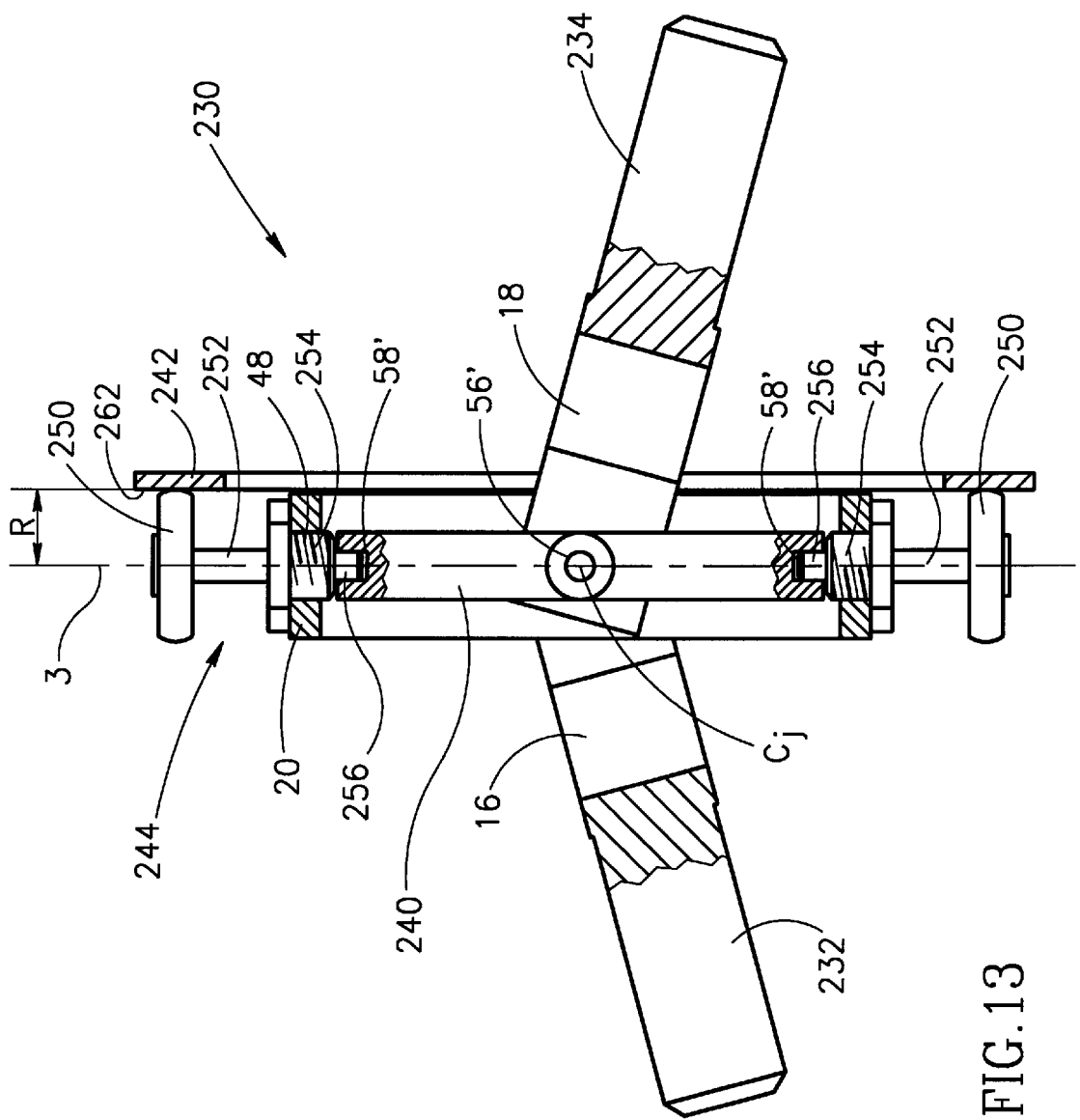
FIG. 13 is a sectional view of the constant velocity joint of FIG. 12 cut horizontally through the plane of the shafts of FIG. 12, as indicated by lines XIII—XIII of FIG. 12.

Reference is now made to FIGS. 11, 12 and 13 which illustrate a further, constant velocity embodiment of the joint of the present invention. FIG. 11 is an exemplary unit which utilizes constant velocity joints and FIGS. 12 and 13 detail the joint in isometric and sectional views, respectively.

FIG. 11 shows a portion of a mechanical system which includes a base 210 and two shafts 212 and 214 which rotate about axes 216 and 218, respectively. Shafts 212 and 214 are connected together via two constant velocity joints, symbolized by spheres 220 and 222, and a length-compensating intermediate shaft 224. In such a system, the bending angles $\beta_i$ of the constant velocity joints 220 and 222 are fixed and the locations of the respective theoretical homokinetic planes of joints 220 and 222 are fixed in base 210.

FIGS. 12 and 13 illustrate the constant velocity joint, labeled 230, intended for use at a fixed bending angle such as shown in FIG. 11. Similar reference numerals refer to similar elements. As in the previous embodiments, joint 230 connects two shafts, herein labeled 232 and 234, with a yoke-ring mechanism which defines axes 1, 2 and 3 all of which intersect at the center Cj of the joint. Inner ring 22 of the previous embodiments, however, is replaced in this embodiment by a kinematically equivalent cross-shaped member 240. The rotary in-line bearings about axis 1 are formed by bores 42 and pins 50 that fit into bores 46 (not shown) of outer ring 20 and the rotary in-line bearings about axis 2 are formed by bores 52 and pins 54 (not shown) that fit into bores 56' (FIG. 13) of cross member 240. The rotary in-line bearings about axis 3 are formed by bores 48 of ring 20 (FIG. 13) into which shafted screws 254 are screwed and whose shafts 256 fit into bores 58' of cross member 240.

Returning to FIG. 12, in this embodiment, the constraining mechanism comprises two roller units 244 and a planar ring 242. Roller units 244 each comprise a roller 250 rotatable about a shaft 252 which, in turn, is a concentric extension of shafted screw 254 and thus, concentric with axis 3. Ring 242 is fixed to a base, such as base 210 of FIG.

11, via mounting holes 260 (FIG. 12) such that its front plane, labeled 262, is a) parallel to the theoretical homokinetic plane of joint 230 and b) a distance R (FIG. 3) from the fixed center point Cj, where R is the radius of both rollers 250. When axis 3 lies in the homokinetic plane, axis 3 is parallel to front plane 262 and both rollers 250 are in contact with plane 262. Axis 3 is constrained to remain in this geometry because, if one roller 250 is pushed away from front plane 262, the other roller is pushed towards front plane 262 (which is impossible). It is noted that the two rollers 262 are located on opposite sides of the center point Cj.

When rotary motion is transferred from shaft 232 to shaft 234 and vice versa, rollers 250 roll over plane 262 and the abovementioned constraint is maintained.

Figure 14:
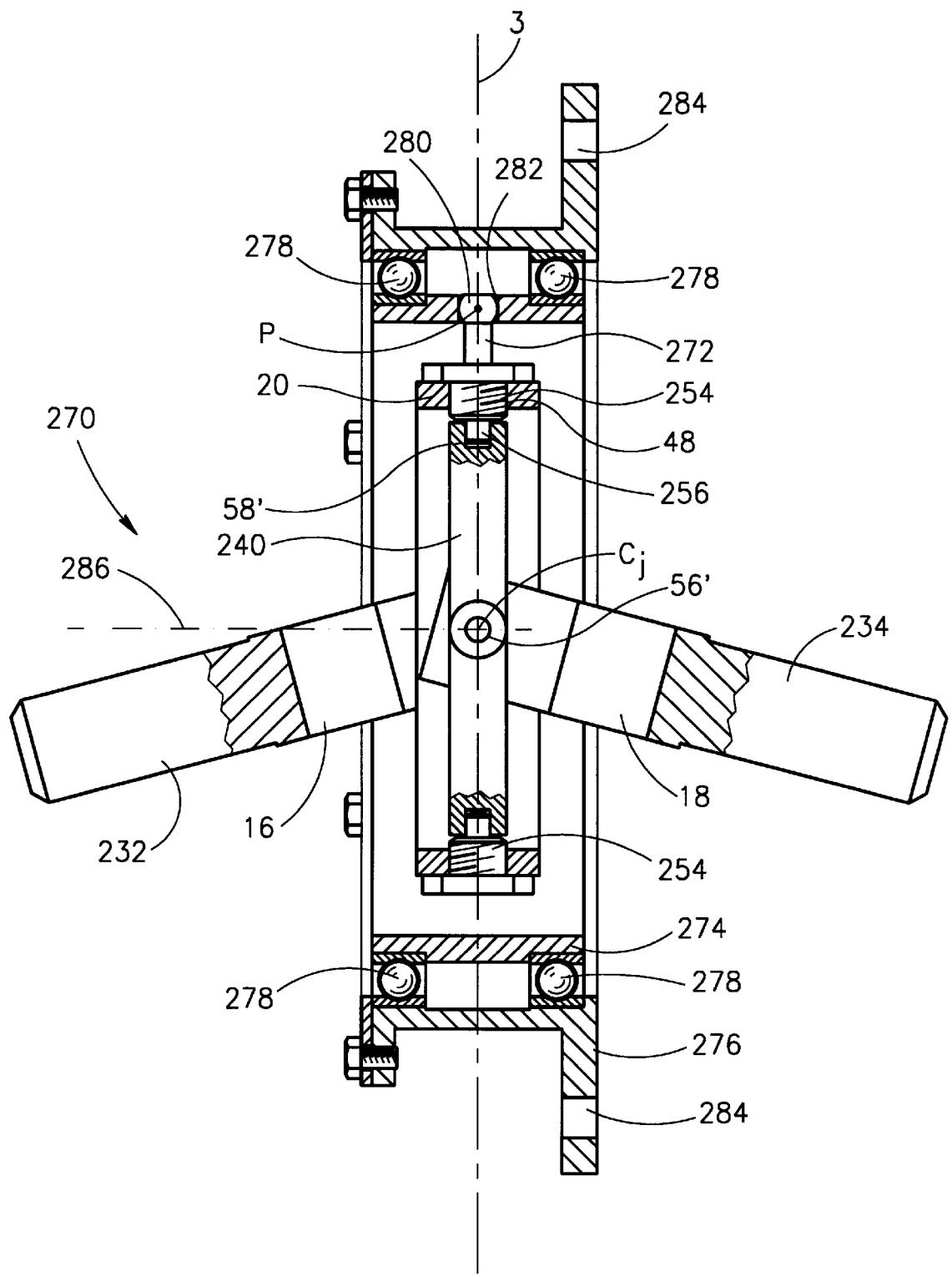
FIG. 14 is a sectional view, similar to FIG. 13, but for a fifth preferred embodiment of the present invention.

Reference is now briefly made to FIG. 14 which illustrates an alternative embodiment, shown in a sectional view, of the constant velocity joint of FIG. 13. The joint of FIG. 14, labeled 270, is similar to joint 230 of FIG. 13 in that joint 270 connects the two shafts 232 and 234 with a yoke-ring mechanism formed of yokes 16 and 18, outer ring 20, cross member 240 and rotary in-line bearings formed from bores 42, 46, 52, 56', 48 and 58', pins 50 and 54 and shafted screws 254 (only bores 56', 48' and 58' and shafted screws 254 are shown).

However, in this embodiment, the constraining mechanism includes a rod 272 which connects ring 20 to an outer cylindrical ring 274 along axis 3, a fixed housing 276 and bearings 278 on which outer cylindrical ring 274 rotates within housing 276. Rod 272 is integrally formed with one of shafted screws 254 and ends with a ball 280 which has a close sliding contact with a radial bore 282 in outer cylindrical ring 274. The center P of ball 280 lies on axis 3.

Housing 276 is fixed to the base of the system via mounting holes 284 in such a way that a) an axis 286 of rotation of outer cylindrical ring 274 is normal to the theoretical homokinetic plane and b) the axis of bore 282 lies in the theoretical homokinetic plane. Thus, bore 282 constrains ball center P to lie in the homokinetic plane and therefore, points P and Cj constrain axis 3 to lie in the homokinetic plane.

It is noted that, when rotary motion is transferred from shaft 232 to shaft 234 and vice versa, ball 280 causes outer cylindrical ring 274 to rotate about its axis 286.

Figure 15:
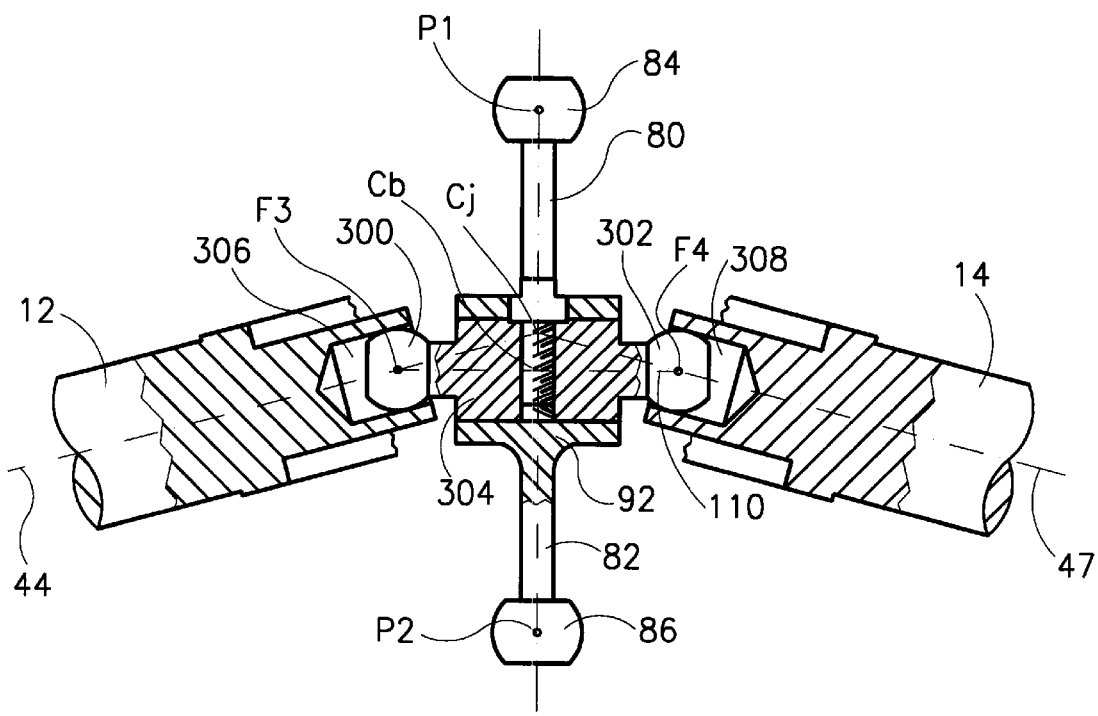
FIG. 15 is a sectional view, similar to FIG. 4, but for a sixth preferred embodiment of the present invention.
Figure 16:
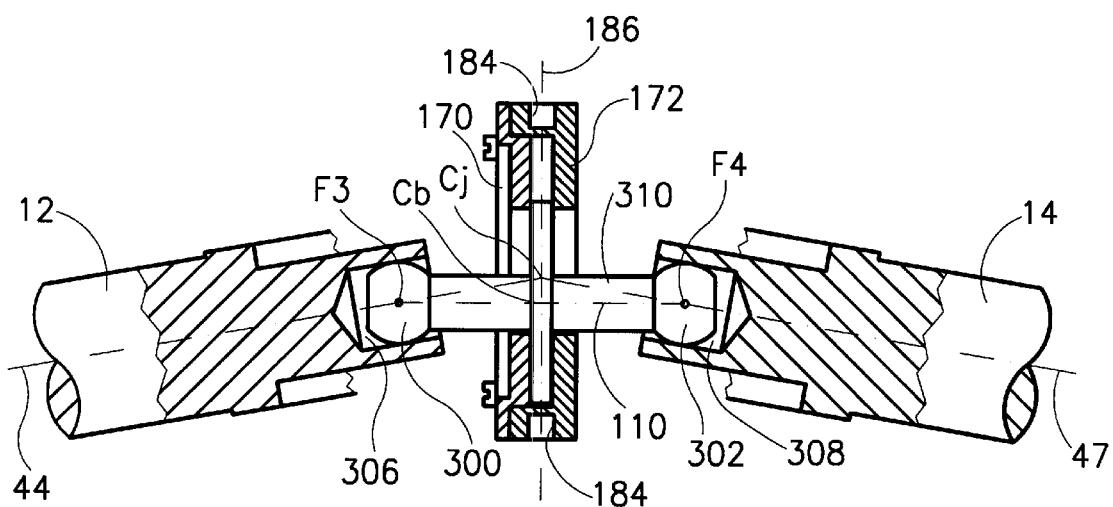
FIG. 16 is a sectional view, similar to FIG. 9, but for a seventh preferred embodiment of the present invention.
Figure 17:
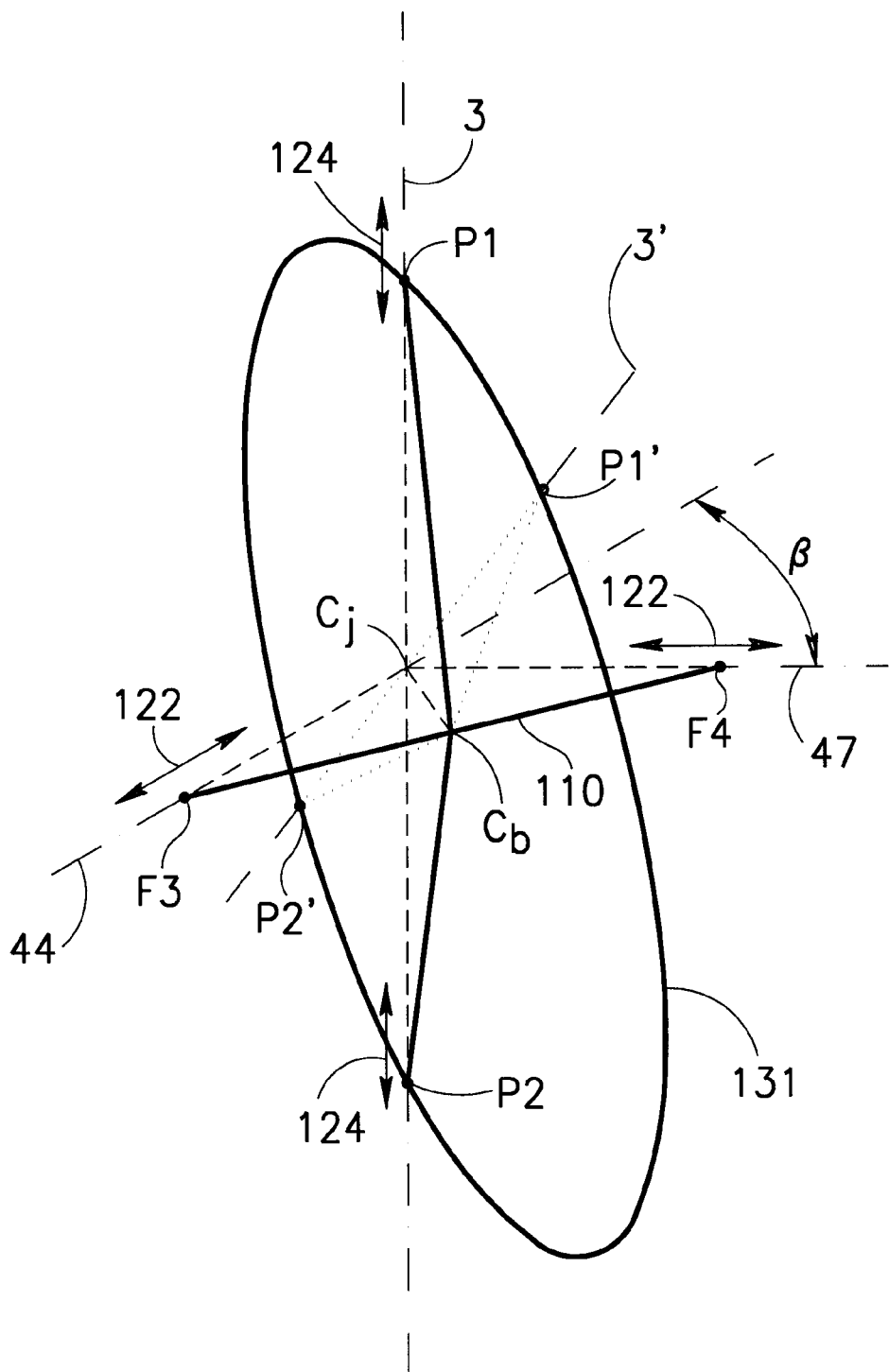
FIG. 17 is a geometric illustration of the principles of operation of the joints of FIGS. 15 and 16.

Reference is now made to FIGS. 15–17 which illustrate a further alternative embodiment of the present invention, wherein the balls 74 and 76 (herein labeled 300 and 302, respectively) are found on the constraining means. FIG. 15 illustrates the alternative structure implemented in the four ball embodiment of FIG. 2, FIG. 16 illustrates the alternative structure implemented in the disk embodiment of FIG. 8 and FIG. 17 illustrates the slightly different kinematics for the alternative structure. FIGS. 15 and 16 are similar in form to FIGS. 4 and 9, respectively; however, for simplicity, the relevant constraining means are shown only with the shafts 12 and 14 since the remaining elements are the same as in the previous embodiments.

The embodiment of FIG. 15 utilizes the cylindrical jacket 92 to which rod 82 is attached but the cylindrical sleeve 90, to which rod 80 is attached, is replaced by a cylindrical stud unit 304 having balls 300 and 302 attached at either end thereof. The centers of balls 300 and 302 are labeled F3 and F4 and are located on the axis 110 of stud unit 304. The center points P1 and P2 of balls 84 and 86 are constrained to lie in the plane which perpendicularly bisects line F3-F4 at its midpoint Cb. Shafts 12 and 14 no longer have balls 74 and 76 attached thereto; instead, they have sockets 306 and 308 formed therein. Sockets 306 and 308 are concentric about the axes 44 and 47 of shafts 12 and 14, respectively. Balls 300 and 302 sit in sockets 306 and 308 when the joint is assembled together.

A similar arrangement can be seen in FIG. 16. The shafts 12 and 14 have sockets 306 and 308 while the sleeve/disk unit 160 is replaced with a ball/disk unit 310 having balls 300 and 302 at the ends thereof. The centers of balls 300 and 302 are labeled F3 and F4 and are located on the axis 110 of unit 310. The annular unit formed of plates 170 and 172 is not changed. However, axis 186 of bores 184 is constrained to lie in the plane which perpendicularly bisects line F3-F4 at its midpoint Cb.

As can be seen in FIG. 17, the kinematics of the embodiments of FIGS. 15 and 16 are similar to those of the previous embodiments. However, in the embodiments of FIGS. 15 and 16, the distance between centers F3 and F4 of balls 300 and 302, respectively, is fixed, rather than being variable. Thus, the line between centers F3 and F4 is shown with a solid line while the lines from centers F3 and F4 to the center Cj of the joint are shown with dashed lines. In this embodiment, centers F3 and F4 move along the axes 44 and 47, respectively.

It will be appreciated by persons skilled in the art that the present invention is not limited to what has been particularly shown and described hereinabove. Rather the scope of the present invention is defined only by the claims which follow:

What is claimed is:

1. A constant velocity universal joint having an instantaneous homokinetic plane, the joint comprising:

a first shaft having a first yoke attached thereto, said first shaft having a first shaft axis and a fit socket at one end of said first shaft, said first socket being concentric about said first shaft axis;

a second shaft having a second yoke, smaller than said first yoke, attached thereto, said second shaft having a second shaft as and a second socket at one end of said second shaft, said second socket being concentric about said second shaft axis an outer member pivotally connected to said first yoke about a first rotation axis, said first rotation axis being perpendicular to said first shaft axis;

an inner member pivotally connected to said second yoke about a second rotation axis, said second rotation axis being perpendicular to said second shaft axis;

wherein said outer member is pivotally connected to said inner member about a third rotation axis, said third rotation axis being perpendicular to both said first and second rotation axes and wherein all five of said axes intersect at a joint center point; and constraining means for constraining said third rotation axis to continuously lie generally within said instantaneous homokinetic plane wherein said constraining means comprises at least two members which rotate with respect to each other about a constraining means axis which is normal to said instantaneous homokinetic plane, wherein one of said two members comprises first and second balls and wherein said firs and second sockets slidably receive said first and second balls wherein said constraining means comprises:

a cylindrical stud unit having a stud axis, said first and second balls, a first rod and a third ball, wherein centers of said first and second balls are connected by a center line which is at least one of parallel and coincident with said stud axis;

a cylindrical jacket having a jacket axis and a slot;

a second rod connected to said cylindrical jacket and extending away from said jacket axis, said second rod ending in a fourth ball; and wherein said first rod extends away from said stud axis, said cylindrical stud sits rotatably about said stud as within said cylindrical jacket, said first rod extends through said slot and center points of said third and fourth balls lie in a plane that perpendicularly bisects said center line, and wherein said inner member has two socket portions concentric about said third rotation axis for slidably receiving said third and fourth balls.

2. A constant velocity universal joint having an instantaneous homokinetic plane, the joint comprising:

a first shaft having a first yoke attached thereto, said first shaft having a first shaft axis and a first socket at one end of said first shaft, said first socket being concentric about said first shaft axis;

a second shaft having a second yoke, smaller than said first yoke, attached thereto, said second shaft having a second shaft axis and a second socket at one end of said second shaft, said second socket being concentric about said second shaft axis an outer member pivotally connected to said first yoke about a first rotation axis, said first rotation axis being perpendicular to said first shaft axis;

an inner member pivotally connected to said second yoke about a second rotation axis, said second rotation axis being perpendicular to said second shaft axis;

wherein said outer member is pivotally connected to said inner member about a third rotation axis, said third rotation axis being perpendicular to both said first and second rotation axes and wherein all five of said axes intersect at a joint center point; and constraining means for constraining said third rotation axis to continuously lie generally within said instantaneous homokinetic plane wherein said constraining means comprises at least two members which rotate with respect to each other about a constraining means axis which is normal to said instantaneous homokinetic plane, wherein one of said two members comprises first and second balls and wherein said first and second sockets slidably receive said first and second balls wherein said constraining means comprises:

a unit having a first member and a second member and an axis of rotation therebetween; and a third ball connected to said first member and a fourth ball connected to said second member, wherein the centers of said third and fourth balls lie in a plane which perpendicularly bisects a center line, wherein said first and second balls are mounted an said first member and their centers are connected by said center line which is at least one of parallel and coincident with said axis of rotation; and wherein said inner member has two socket portions concentric about said third rotation said for slidably receiving said third and fourth balls.

* * * * *